United States Patent [19]

Nakatani et al.

[11] Patent Number: 4,959,151
[45] Date of Patent: Sep. 25, 1990

[54] PERVAPORATION METHOD OF SEPARATING LIQUID ORGANIC COMPOUND MIXTURE THROUGH AROMATIC IMIDE POLYMER ASYMMETRIC MEMBRANE

[75] Inventors: Masayuki Nakatani; Makoto Matsuo; Yoshihiro Kusuki, all of Ichihara, Japan

[73] Assignee: Ube Industries, Yamaguchi, Japan

[21] Appl. No.: 412,892

[22] Filed: Sep. 26, 1989

[30] Foreign Application Priority Data

Sep. 27, 1988 [JP] Japan .................. 63-239838
Oct. 7, 1988 [JP] Japan .................. 63-252052
Oct. 7, 1988 [JP] Japan .................. 63-25053
Oct. 7, 1988 [JP] Japan .................. 63-252054
Oct. 7, 1988 [JP] Japan .................. 63-252055
Oct. 7, 1988 [JP] Japan .................. 63-252056

[51] Int. Cl.$^5$ ............................. E01D 61/36
[52] U.S. Cl. ......................... 210/640; 55/16; 210/654
[58] Field of Search ............. 55/16, 158; 210/634, 210/640, 644, 649, 650, 651, 652, 653, 654, 500.37, 500.38, 500.39

[56] References Cited

U.S. PATENT DOCUMENTS 4,240,914 12/1980 Iwana et al. .................. 210/500.39
4,358,378 11/1982 Iwawa et al. .................. 210/500.23

Primary Examiner—Frank Sever
Attorney, Agent, or Firm—Burgess, Ryan & Wayne

[57] ABSTRACT

A pervaporation method of separating a liquid organic compound mixture at a high speed and efficiency through an aromatic polyimide asymmetric separating membrane produced from an aromatic tetracarboxylic acid component comprising at least 70 molar % of biphenyl or diphenylether tetracarboxylic dianhydride and an aromatic diamine component comprising 85 molar % or more of an aromatic diamine having 2 to 3 benzene ring structure, or 15 molar % or more of 9,10-di(aminophenyl)anthracene, di(aminophenoxy)diphenylsulfone, di(aminophenoxy)biphenyl or di(aminophenoxy)diphenylalkane compounds, or a mixture of 15 to 50 molar % of an aromatic diamine having alone benzene or pyridine ring structure and 50 to 85 molar % of an aromatic diamine having a 2 to 3 benzene ring structure.

18 Claims, No Drawings

PERVAPORATION METHOD OF SEPARATING LIQUID ORGANIC COMPOUND MIXTURE THROUGH AROMATIC IMIDE POLYMER ASYMMETRIC MEMBRANE

BACKGROUND OF THE INVENTION

1. Field of the Invention

The present invention relates to a pervaporation method of separating a liquid organic compound mixture through an aromatic imide polymer asymetric membrane.

More particularly, the present invention relates to a pervaporation method of separating a liquid organic compound mixture through an aromatic imide polymer asymmetric membrane at a high selectivity and at a high permeation rate.

2. Description of the Related Art

It is known that a liquid mixture of two or more types of organic compounds can be separated into individual organic components by a distillation method, but in the distillation method, some of the organic compounds form an azeotropic mixture, or have boiling points close to each other, or are chemically modified at the distillation temperature, and therefore, it is very difficult to separate them from each other.

To avoid the above difficulty, a method of separating the liquid organic compound mixture by using a separating membrane has been attempted. In this method, wherein a membrane is used to separate or concentrate an organic compound aqueous solution, a diluted aqueous solution of organic compounds is brought into contact with a surface of a membrane, to allow a specific liquid component to selectively permeate through the membrane due to a differential osmotic pressure. This method is referred to as a reverse osmosis method.

Usually, in the reverse osmosis method for a aqueous solution, a higher pressure than the osmotic pressure of the aqueous solution must be applied to the aqueous solution, and therefore, the reverse osmosis method can not be applied to a concentrated organic compound aqueous solution which exhibits a high osmotic pressure, and accordingly, the reverse osmosis method can be applied only to organic compound aqueous solutions having a limited concentration.

Recently, as a new type of separating method in which a separating membrane is used, a pervaporation method has been developed for a liquid organic compound mixture and is now under serious consideration in this field.

In the pervaporation method, an organic compound mixture in the state of a liquid is brought into direct contact with a feed side face of a separating membrane capable of selectively allowing a specific organic compound to permeate therethrough, and the opposite delivery side face of the membrane is exposed to a vacuum or a reduced pressure. The specific compound is allowed to selectively permeate through the membrane and is collected in the state of a vapor at the opposite delivery side of the membrane. This method is useful for selectively separating or concentrating an individual organic compound from a liquid organic compound mixture.

Many proposed pervaporation methods have been reported. For example, Japanese Unexamined Patent Publication No. 52-111888 discloses a separation of a benzene-cyclohexane mixture solution or benzenehexane mixture solution by using an ionomer type polymer; and Japanese Unexamined Patent Publication No. 59-30441 discloses a separation of the above-mentioned mixture solution by using a polyamide membrane.

Nevertheless, the conventional separating membranes for the pervaporation method are disadvantageous in that;

(1) the permeation rate of the membrane for individual organic compounds to be separated or concentrated is unsatisfactorily low;

(2) the selectivity of the membrane for separating the individual organic compounds is unsatisfactory;

(3) the heat resistance and solvent resistance of the membrane are unsatisfactory; and (4) the membrane has a low durability, and thus cannot be employed continuously over a long time; e.g., when separating various individual organic compounds from a mixture.

Also, Japanese Unexamined Patent Publication No. 63-7804 discloses, as a comparative example, a method of separating an acetic acid aqueous solution by pervaporation, in which a separating membrane is made of a pyromellitic acid type aromatic polyimide, and reports that this type of aromatic polyimide membrane exhibits a very poor separating property in the pervaporation method.

It is known that a separating membrane comprising a biphenyltetra-carboxylic acid-type aromatic polyimide can be used in the osmosis separating procedure for inorganic salt aqueous solutions but it is not known how to effectively carried out the pervaporation method by using an aromatic imide polymer separating membrane.

SUMMARY OF THE INVENTION

An object of the present invention is to provide a pervaporation method of separating at least one organic compound from a liquid organic compound mixture, at a high selectivity and with a high efficiency.

Another object of the present invention is to provide a pervaporation method of separating a liquid organic compound mixture through a specific aromatic imide polymer asymmetric membrane having a high durability and thus able to be continuously employed for a long time.

The above-mentioned objects can be attained by the pervaporation method of the present invention of separating a liquid organic compound mixture, which comprises the steps of:

bringing a mixture of two or more types of organic compounds in the state of a liquid into contact with one face of an aromatic imide polymer asymmetric membrane which is comprised of a solvent soluble polymerization product of:

(A) an aromatic tetracarboxylic acid component comprising
 (a) 70 to 100 molar % of at least one principal member selected from the group consisting of biphenyl tetracarboxylic acids, diphenylether tetracarboxylic acids, and dianhydrides, esters and salts of the above-mentioned acids, and
 (b) 0 to 30 molar % of at least one additional member selected from the group consisting of aromatic tetracarboxylic acids, and dianhydrides, esters and salts of those acids which are different from the above-mentioned compounds for the principal members; with (B) an aromatic diamine component comprising at least one member selected from the group consisting of:

(c) an ingredient comprising;
   (i) 85 to 100 molar % of at least one principal member selected from aromatic diamines having 2 to 3 benzene ring structures, and
   (ii) 0 to 15 molar % of at least one member selected from aromatic diamines other than the above-mentioned diamines (i) for the principal member;
(d) an ingredient comprising
   (iii) 15 to 100 molar % of at least one member selected from the group consisting of 9,10-di(aminophenyl)anthracene compounds di(aminophenoxy)diphenylsulfone compounds, di(aminophenoxy)biphenyl compounds, and di(aminophenoxy)diphenylalkane compounds,
   (iv) 0 to 85 molar % of at least one member selected from aromatic diamines having 2 to 3 benzene ring structures, and
   (v) 0 to 15 molar % of at least one member selected from aromatic diamines having one member selected from the group consisting of one benzene ring structure and one pyridine ring structure;
(e) an ingredient comprising:
   (vi) 15 to 50 molar % of at lest one member selected from aromatic diamines having one member selected from the group consisting of one benzene ring structure and one pyridine ring structure, and
   (vii) 50 to 85 molar % of at least one member selected from aromatic diamines having 2 to 3 benzene ring structures, exposing the opposite face of the aromatic imide polymer asymmetric membrane to an atmosphere under a reduced pressure, to cause at least one type of the organic compound in the mixture to selectively permeate through the asymmetric membrane and the permeated organic compound to be vaporized; and collecting the permeated and vaporized organic compound.

DESCRIPTION OF THE PREFERRED EMBODIMENTS

The pervaporation method of the present invention of separating or concentrating at least one organic compound from a liquid organic compound mixture is carried out by using a specific aromatic imide polymer asymmetric separating membrane.

The specific separating membrane of the present invention comprises a solvent soluble polymerization product of (A) an aromatic tetracarboxylic acid component with (B) an aromatic diamine component.

The aromatic tetracarboxylic acid component (A) comprises:
(a) 70 to 100 molar %, preferably 80 to 100 molar %, more preferably 90 to 100 molar %, of at least one principal member selected from the group consisting of biphenyl tetracarboxylic acids, diphenylether tetracarboxylic acids, and dianhydrides, esters, preferably lower alkyl esters having 1 to 3 carbon atoms, and salts of the above-mentioned acids, and
(b) 0 to 30 molar %, preferably 0 to 20 molar %, more preferably 0 to 10 molar %, of at least one additional member selected from the group consisting of aromatic tetracarboxylic acids, and dianhydrides, esters, preferably lower alkyl esters having 1 to 3 carbon atoms, and salts of those acids which are different from the above-mentioned compounds for the principal members.

The aromatic tetracarboxylic acid compound for the principal acid member (a) is preferably selected from the group consisting of 2,3,3',4'-biphenyltetracarboxylic acid, 3,3',4,4'-biphenyltetracarboxylic acid, 3,3',4,4'-diphenylether tetracarboxylic acid, and dianhydrides, lower alkyl esters, preferably having 1 to 3 atoms and salts of the above-mentioned acids, more preferably 3,3'4,4'-biphenyltetracarboxylic dianhydride and 3,3'4,4'-diphenylethertetracarboxylic dianhydride, most preferably 3,3',4,4'-biphenyltetracarboxylic dianhydride.

The aromatic tetracarboxylic acid compound for the additional member (b) is preferably selected from the group consisting of pyromellitic acid, 2,2-bis(3,4-dicarboxyphenyl)propane, bis(3,4-dicarboxyphenyl) methane, 3,3'4,4'-benzophenonetetracarboxylic acid, and dianhydrides, lower alkyl esters, preferably having 1 to 3 carbon atoms, and salts of the above-mentioned acids.

In the aromatic tetracarboxylic acid component (A) when the content of the principal aromatic tetracarboxylic acid component (a) is less than 70 molar %, or the content of the additional aromatic tetracarboxylic acid compound (b) is more than 30 molar %, the resultant aromatic imide polymer exhibits a poor solubility in phenolic solvents, and thus it becomes difficult to produce an asymmetric separating membrane having a uniform quality or a satisfactory pervaporation-separation property for organic compounds mixtures.

The aromatic diamine component (B) usable for producing the separating asymmetric membrane of the present invention comprises at least one ingredient selected from the group consisting of:
(c) an ingredients comprising:
   (i) 85 to 100 molar %, preferably 90 to 100 molar %, of at least one principal member selected from aromatic diamines having 2 to 3 benzene ring structures, and
   (ii) 0 to 15 molar %, preferably 0 to 10 molar %, of at least one member selected from aromatic diamines other than the above-mentioned diamines (i) for the principal member;
(d) an ingredient comprising:
   (iii) 15 to 100 molar %, preferably 25 to 100 molar %, of at least one member selected from the group consisting of 9,10-di(aminophenyl)anthracene compounds, di(aminophenoxy)diphenylsulfone compounds, di(aminophenoxy)biphenyl compounds, and di(aminophenoxy)diphenylalkane compounds,
   (iv) 0 to 85 molar %, preferably 0 to 75 molar %, of at least one member selected from aromatic diamines having 2 to 3 benzene ring structures, and
   (v) 0 to 15 molar %, of at least one member selected from aromatic diamines having one benzene or pyridine ring structure; and
(e) an ingredients comprising
   (vi) 15 to 50 molar %, preferably 16 to 40 molar %, of at least one member selected from aromatic diamines having one benzene or pyridine ring structure, and
   (vii) 50 to 85 molar %, preferably 60 to 84 molar %, of at least one member selected from aromatic diamines having 2 to 3 benzene ring structures.

In the above-mentioned aromatic diamine ingredients (c), (d) and (e), the aromatic diamines (i), (iv) and (vii) having 2 to 3 benzene ring structures are preferably selected from the group consisting of bis(aminophenoxy)benzene compounds, bis(aminophenyl)benzene compounds, diaminodiphenylether compounds, diaminodiphenyl thioether compounds, diaminodiphenyl sulfone compounds, diaminodiphenylalkane compounds, diaminobiphenyl compounds, diaminodibenzothiophene compounds, and diaminothioxanthene compounds.

The aromatic diamines having 3 benzene ring structures and usable as the aromatic diamines (i), (iv) and (vii) are preferably selected from bis(aminophenoxy)benzene compounds, for example, 1,4-bis(4-aminophenoxy)benzene, 1,4-bis(3-aminophenoxy)benzene and 1,3-bis(4-aminophenoxy)benzene.

The aromatic diamines having 2 benzene ring structures and usable as the aromatic diamines (i), (iv) and (vii), are preferably selected from diaminodiphenylether compounds, for example, 4,4'-diaminodiphenylether and 3,4'-diaminodiphenylether; diaminodiphenylmethane compounds, for example, 4,4'-diaminodiphenylmethane and 3,4'-diaminodiphenylmethane; diaminodiphenylpropane compounds, for example, 4,4'-diamino-(2,2-diphenylpropane) and 3,4'-diamino-(2,2-diphenylpropane); diaminodiphenylsulfone compounds, for example, 4,4'-diaminodiphenylsulfone and 3,3'-diaminodiphenylsulfone; and diaminobiphenyl compounds, for example, 3,3'-dimethoxy benzidine.

Preferably, the above-specified ingredient (c) contains at least 20 molar %, more preferably 25 to 100 molar %, of at least one member selected from the group consisting of diaminodibenzothiophene compounds, diaminothioxanthene compounds and diaminodiphenylalkane compounds which have 2 benzene ring structures. The ingredient (c) may contain, in addition to the above-mentioned diamine compounds, 80 molar % or less, preferably 0 to 75 molar % of at least one member selected from aromatic diamines having 2 to 3 benzene ring structures and different from the above-mentioned diamine compounds. The above-mentioned specific ingredient (c) is useful for obtaining an aromatic imide polymer asymmetric membrane having an excellent separating property for organic compounds.

The diaminodibenzothiophene compounds usable as the aromatic diamines (i), (iv) and (vii), especially in the ingredient (c), are preferably selected from those of the formula (I):

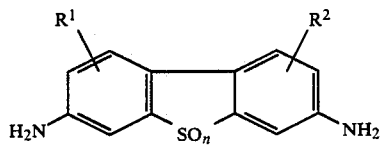

wherein $R^1$ and $R^2$ represent, respectively and independently from each other, a member selected from the group consisting of a hydrogen atom and methyl and ethyl radicals, and n represents 0 or 2.

The compounds of the formula (I) include, for example, 3,7-diaminodibenzothiophene, 3,7-diaminodibenzothiophene-5,5-dioxide, 2,8-dimethyl-3,7diaminodibenzothiophene, 2,6-dimethyl-3,7-diaminodibenzothiophene, 4,6-dimethyl-3,7-diaminodibenzothiophene, 2,8-dimethyl-3,7-diaminodibenzothiophene-5,5-dioxide, 2,6-dimethyl-3,7-diaminodibenzothiophene-5,5-dioxide, 4,6-dimethyl-3,7-diaminodibenzothiophene-5,5-dioxide, 2,8-diethyl-3,7-diaminodibenzothiophene, 2,6-diethyl-3,7-diaminodibenzothiophene, 4,6-diethyl-3,7-diaminodibenzothiophene, 2,8-diethyl-3,7-diaminodibenzothiophene-5,5-dioxide, 2,6-diethyl-3,7-diaminodibenzothiophene-5,5-dioxide, and 4,6-diethyl-3,7-diaminodibenzothiophene-5,5-dioxide.

The diaminothioxanthene compounds usable as the aromatic diamines (i), (iv) and (vii), especially in the ingredient (c), are preferably selected from those of the formula (II):

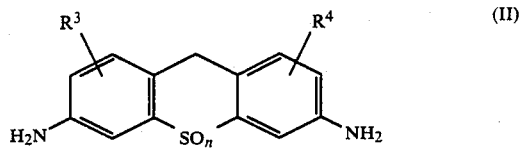

wherein $R^3$ and $R^4$ represent, respectively and independently from each other, a member selected from the group consisting of a hydrogen atom and a methyl radical, and n represents 0 or 2.

The compounds of the formula (II) include, for example, 3,7-diaminothioxanthene, 3,7-diaminothioxanthene-5,5-dioxide, 2,8-dimethyl-3,7-diaminothioxanthene, 2,6-dimethyl-3,7-diaminothioxanthene, 4,6-dimethyl-3,7-diaminothioxanthene, 2,8-dimethyl-3,7-diaminothioxanthene-5,5-dioxide, 2,6-dimethyl-3,7-diaminothioxanthene-5,5-dioxide, and 4,6-dimethyl-3,7-diaminothioxanthene-5,5-dioxide.

The diaminodiphenylalkane compounds usable as the aromatic diamines (i), (iv) and (vii) especially in the ingredient (c), are preferably selected from those of the formula (III):

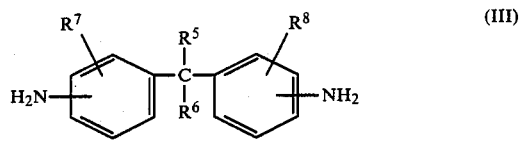

wherein $R^5$, $R^6$, $R^7$ and $R^8$ represent, respectively and independently from each other, a member selected from the group consisting of a hydrogen atom and a methyl radical.

The compounds of the formula (III) include, for example, diaminodiphenylmethane compounds, for example, 4,4'-diaminodiphenylmethane, 3,4'-diaminodiphenylmethane and 3,3'-dimethyl-4,4'-diaminodiphenylmethane; and diamino-2,2-bis(phenyl) propane compounds, for example, 2,2-bis(4-aminophenyl)propane, 2,2-bis(3-aminophenyl)propane and 3,4'-diamino-(2,2-diphenyl)propane.

In the ingredient (c), the aromatic diamine (ii) other than the aromatic amine (i) is preferably selected from the group consisting of m-phenylene diamine, and p-phenylene diamine, 3,5-diaminobenzoic acid, and 2,6-diamino benzoic acid.

In the aromatic diamine ingredient (d) 9,10-di(aminophenyl)anthracene compounds usable as the aromatic diamine (iii) are preferably selected from those of the formula (IV):

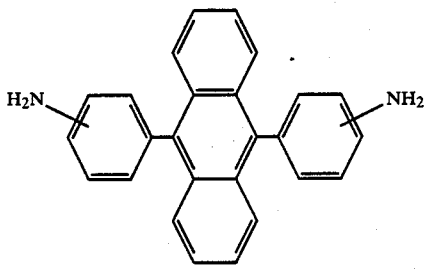

(IV)

The compounds of formula (IV) include, for example, 9,10-bis(4-aminophenyl)anthracene, 9,10-bis(3-aminophenyl)anthracene and 9-(4-aminophenyl)-10-(3-aminophenyl) anthracene.

Also, in the aromatic diamine ingredient (d), the di(aminophenoxy)diphenylsulfone compounds usable as the aromatic diamine (iii) are preferably selected from the group consisting of 4,4'-bis(4-aminophenoxy)diphenylsulfone, 4,4'-bis(3-aminophenoxy)diphenylsulfone and 3,4'-di(4-aminophenoxy) diphenylsulfone.

Further, in the aromatic diamine mixture (d), the di(aminophenoxy)biphenyl compounds usable as the aromatic diamine (iii) are preferably selected from those of the formula (v):

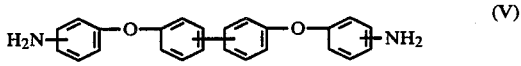

(V)

The compounds of the formula (V) include, for example, 4,4'-di(4-aminophenoxy)biphenyl, 4,4'-di(3-aminophenoxy)biphenyl, 3,4'-di(4-aminophenoxy)biphenyl, and 3,4'-di(3-aminophenoxy)biphenyl.

Furthermore, in the aromatic diamine ingredient (d), the di(aminophenoxy)diphenylalkane compounds usable as the aromatic diamine (iii) are preferably selected from those of the formula (VI):

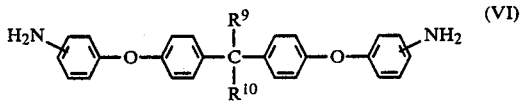

(VI)

wherein $R^9$ and $R^{10}$ represent, respectively and independently from each other, a member selected from the group consisting of a hydrogen atom and methyl and halogen-substituted methyl radicals.

The compounds of the formula (VI) include, for example, 4,4'-di(4-aminophenoxy)diphenylmethane, 4 4'-di(3-aminophenoxy)diphenylmethane, 2,2-bis[4-(4-amino-phenox)phenyl] propane, 2,2-bis[4-(3-aminophenoxy)phenyl] propane, 2,2-bis[4-(4-aminophenoxy)phenyl] perfluoropropane, and 2,2-bis[4-(3-aminophenoxy)phenyl] perfluoropropane.

The aromatic diamines (v) and (vi) in the aromatic diamine ingredient (d), have a member selected from the group consisting of one benzene ring structure and one pyridine ring structure, and are preferably selected from the group consisting of phenylenediamine compounds, for example, m-phenylenediamine and p-phenylenediamine; diaminobenzoic acid compounds, for example, 2,4-diaminobenzoic acid, 3,5-diaminobenzoic acid, 3,6-diaminobenzoic acid, methyl 2,4-diaminobenzoate and methyl 3,5-diaminobenzoate; diaminopyridine compounds, for example, 2,6-diaminopyridine and 3,5-diaminopyridine; alkylated phenylenediamine compounds, for example, 2-methyl-p-phenylenediamine, 4-methyl-m-phenylene-diamine, 2,5-dimethyl-p-phenylenediamine and 2,5-diethyl-p-phenylenediamine, in which the alkyl groups have 1 to 5 carbon atoms; and alkoxylated phenylenediamine compounds, for example, 2-methoxy-p-phenylenediamine, and 4-methoxy-m-phenylenediamine.

In a preferable embodiment of the present invention, the aromatic tetracarboxylic acid component (A) comprises 80 to 100 molar % of the principal acid member (a) and 0 to 20 molar % of the additional acid member (b), and the aromatic diamine component (B) comprises 90 to 100 molar % of the aromatic diamine (i) having 2 to 3 benzene ring structures and 0 to 10 molar % of the other aromatic diamine (ii). Particularly, preferably the aromatic tetracarboxylic acid component (A) comprises:

90 to 100 molar % of at least one principal member selected from the group consisting of biphenyl tetracarboxylic acids, diphenylether tetracarboxylic acids, and dianhydrides, esters and salts of the above-mentioned acids, and 0 to 10 molar % of at least one additional member selected from the group consisting of aromatic tetracarboxylic acids, and dianhydrides, esters and salts of the above-mentioned acids, which are different from the above-mentioned member; and the aromatic diamine component (B) comprises:

90 to 100 molar % of at least one principal member selected from aromatic diamines having 2 to 3 benzene ring structures, and 0 to 10 molar % of at least one additional member selected from aromatic diamines other than the above-mentioned aromatic diamines for the principal member.

In another preferable embodiment of the present invention, the aromatic tetracarboxylic acid component (A) comprises:

preferably 70 to 100 molar %, more preferably 80 to 100 molar %, most preferably 90 to 100 molar %, of at least one principal member selected from the group consisting of biphenyltetracarboxylic acids, and dianhydrides, esters and salts of the above-mentioned acids, and preferably 0 to 30 molar %, more preferably 0 to 20 molar %, most preferably 0 to 10 molar %, of at least one additional member selected from the group consisting of aromatic tetracarboxylic acids and dianhydrides, esters and salts of the above-mentioned acids, which are different from the above-mentioned compounds for the principal member; and the aromatic diamine component (B) comprises:

preferably 25 to 100 molar %, more preferably 40 to 100 molar %, of at least one member selected from the group consisting of 9,10-di(aminophenyl)anthracene compounds, di(aminophenoxy)diphenylsulfone compounds, di(aminophenoxy)biphenyl compounds, and di(aminophenoxy)diphenylalkane compounds, and preferably 0 to 75 molar %, more preferably 0 to 60 molar % of at least one member selected from aromatic diamines having 2 to 3 benzene ring structures, and 0 to 15 molar %, of at least one member selected from aromatic diamines having one benzene or pyridine ring structure.

In still another preferable embodiment of the present invention, the aromatic tetracarboxylic acid component (A) comprises:

preferably 70 to 100 molar %, more preferably 80 to 100 molar %, most preferably 90 to 100 molar %, of at least one principal member selected from the group consisting of biphenyl tetracarboxylic acids, and dianhydrides, esters and salts of the above-mentioned acids, and preferably 0 to 30 molar %, more preferably 0 to 20 molar %, most preferably 0 to 10 molar %, of at least one additional member selected from the group consisting of aromatic tetracarboxylic acids and dianhydrides, esters and salts of the above-mentioned acids, which are different from the above-mentioned compounds for the principal member; and the aromatic diamine component (B) comprises:

15 to 50 molar %, more preferably 16 to 40 molar %, of at least one member selected from the aromatic diamines having one benzene or pyridine ring structure, and 50 to 85 molar %, more preferably 60 to 84 molar %, of at least one member selected from the aromatic diamines having 2 to 3 benzene ring structures.

The aromatic imide polymer usable for the present invention can be produced by the polymerization-imidization of the aromatic tetracarboxylic acid component (A) with the aromatic diamine component (B) in an organic solvent comprising of at least one phenolic compound.

The polymerization-imidization procedures can be carried out at a high temperature of 150° C. to 250° C. or at a low temperature of 0° C. to 100° C. in the presence of an imidizing agent, for example, acetic anhydride and pyridine.

The organic solvent comprises at least one member selected from the group consisting of, for example, phenol, 2-chlorophenol, 4-chlorophenol, 4-bromophenol, cresol, N,N-dimethyl acetamids and dimethylsulfoxide.

The resultant aromatic imide polymer is soluble in the above-mentioned organic solvent.

The aromatic imide polymer is converted to an asymmetric separating membrane, and the asymmetric membrane may be in the form of a hollow filament or in the form of a film.

The asymmetric membrane usable for the method of the present invention can be prepared by dissolving the solvent soluble polymerization product of the aromatic tetracarboxylic acid component (A) with the aromatic diamine component (B), namely, a solvent soluble specific aromatic imide polymer, in a solvent comprising at least one phenolic compound to provide a dope solution; shaping the dope solution into a hollow filament-formed stream or a film-formed layer; bringing the shaped dope solution into contact with a coagulating bath to provide a solidified membrane; washing the solidified membrane with an organic solvent not capable of dissolving the solidified membrane; drying the washed membrane; and aging the dried membrane at a temperature of 150° C. to 420° C.

In the asymmetric membrane-preparing process, the aromatic imide polymer is dissolved in the above-mentioned solvent to provide a dope solution.

Preferably, in the dope solution, the aromatic imide polymer is in a concentration of 5 to 30% by weight.

The dope solution is shaped in a hollow filamentary stream thereof by extruding through a spinning nozzle for hollow filaments or in a flat filmy layer by extruding through a slit for film, or by spreading on a film-forming surface, for example, a horizontal surface of a film-forming plate or a peripheral surface of a rotating film-forming drum. The resultant shaped dope solution is brought into contact with a coagulating liquid to provide a solidified membrane. The coagulating liquid is compatible with the solvent in the dope solution but cannot dissolve therein the aromatic imide polymer in the dope solution. The coagulated aromatic imide polymer asymmetric membrane is washed with an organic solvent not capable of dissolving the solidified membrane. The washing organic solvent comprises at least one member selected from, for example, lower aliphatic alcohols, for example, methyl alcohol, ethyl alcohol, propyl alcohols and butyl alcohols and aliphatic and cycloaliphatic hydrocarbons, for example, n-hexane, n-heptane n-octane and cyclohexane.

Then, the washed membrane is dried and aged at a temperature of 150° C. to 420° C., preferably 180° C. to 400° C., more preferably 180 to 350° C., for 0.1 to 5 hours.

The method of producing a polymeric asymmetric membrane is disclosed, for example, in Japanese Unexamined Patent Publication Nos. 56-21602 and 56-157435.

When the aromatic imide polymer asymmetric membrane is used for the pervaporation method of the present invention to selectively separate a specific organic compound x having a highest permeation rate, from a liquid organic compound mixture containing the compound x and another one compound y, the asymmetric membrane preferably allows the specific organic compound x to permeate therethrough at a permeation rate Q of about 0.1 kg/m$^2$·hr or more, more preferably 0.2 to 5 kg/m$^2$·hr, and exhibits a separating coefficient $\alpha$ for specific organic compounds x and y, of 5 or more, more preferably 10 or more, still more preferably from 15 to 6000.

The permeation rate Q of a specific organic compound fraction through a separating membrane is defined by the equation:

$$Q = A/B$$

wherein A represents an amount (in kg) of the specific organic compound fraction permeated through the membrane per hour and B represents a permeation area in m$^2$ of the membrane through which the specific organic compound fraction permeates.

The separation coefficient $\alpha$ of a separating membrane for the specific organic compounds x and y is defined by the equation:

$$\alpha = C_2/C_1$$

wherein $C_1$ represents a proportion in weight of the specific organic compound x to the weight of organic compound y in the organic liquid mixture to be fed and separated and $C_2$ represents a proportion in weight of the specific organic compound x permeated through the membrane to the weight of the organic compound y permeated through the membrane.

In the pervaporation method of the present invention a mixture of two or more types of organic compound in the state of a liquid is brought into contact with one surface of the aromatic imide polymer asymmetric membrane; the opposite face of the aromatic imide polymer asymmetric membrane is exposed to an atmosphere under a reduced pressure, to cause at least one type of the organic compound in the liquid mixture to selectively penetrate and permeate through the asymmetric membrane; and the permeated organic compound is collected in the state of a vapor in the reduced pressure atmosphere.

Practically, the pervaporation method of the present invention is carried out in the following steps.

(a) A liquid organic compound mixture is fed to a feed side of a separating membrane module containing a number of aromatic imide polymer asymmetric membranes (in the form of a hollow filament or a flat film) so that the fed liquid organic mixture comes into direct contact with one face of each membrane.

(b) A delivery side opposite to the feed side of the separating membrane module is exposed to a reduced pressure by connecting the delivery side to a pressure-reducing or vacuum pump placed outside of the separating membrane module, if necessary while flowing a carrier gas (sweeping gas), for example, helium, nitrogen, and argon gases and air, through the delivery side, to selectively allow at least one organic compound to penetrate and permeate through the membranes and to be withdrawn in the state of a vapor at the delivery side of the module.

(c) Finally, the permeated organic compound in the state of a vapor is collected from the delivery side of the module, and if necessary condensed by cooling, and the remaining non-permeated portion of the liquid organic compound mixture is recovered from the feed side of the module.

Usually, the liquid organic compound mixture is fed into the separating membrane module preferably at a temperature of from about 0° C. to 120° C., more preferably from 20° C. to 100° C.

In the method of the present invention, the pressure at the delivery side of the separating membrane module is lower than that at the feed side. Usually, the pressure at the feed side of the separating membrane module is preferably from atmospheric pressure to 60 kg/cm², more preferably from atmospheric pressure to 30 kg/cm².

Also, the pressure at the delivery side of the separating membrane module is lower than the atmospheric pressure, and is preferably about 200 Torr or less, more preferably 100 Torr or less. If necessary, a sweeping gas is made to flow through the delivery side of the module, to promote the permeation of the specific organic compound.

The pervaporation method of the present invention can be applied to various types of liquid organic compound mixtures. Namely, the pervaporation method of the present invention is specifically useful for separating liquid organic compound mixtures containing two or more azeotropic organic compounds which cannot be separated by a usual distillation method, and mixtures containing two or more organic compounds which have boiling points very close to each other and thus are very difficult to separate by the usual distillation method.

In the liquid organic compound mixtures, all of the compounds may be completely dissolved in each other, or a portion of the compounds may not be dissolved and may be suspended in the mixture, as long as the mixture is in the state of a liquid as a whole, under the required pervaporation conditions, for example, temperature and pressure.

The azeotropic organic compound mixtures include, for example, benzene-cyclohexane mixtures, benzene-n-hexane mixtures, methyl alcohol-acetone mixtures, benzene-methyl alcohol mixtures, acetone-chloroform (trichloromethane) mixtures, ethyl alcohol-cyclohexane mixtures, butyl alcohol-cyclohexane mixtures, chloroform-n-hexane mixtures, ethyl alcohol-benzene mixtures, ethyl alcohol-toluene mixtures and xylene isomer mixtures.

The organic compound mixtures containing two or more organic compounds having boiling points very close to each other, i.e., having a difference in boiling points of about 20° C. or less, particularly about 10° C. or less, include ethyl benzene-styrene mixtures, p-chloroethylbenzene-p-chlorostyrene mixtures, toluene-methylcyclohexane mixtures, butadiene-butene compound mixtures, butadiene-butane compound mixtures, and n-butene-1-isobutene mixtures.

The pervaporation method of the present invention can be effectively applied not only to the above-mentioned two organic compound mixtures but also to three or more organic compound mixtures.

In the organic compound mixtures to be separated or concentrated by the pervaporation method of the present invention, the two or more different types of organic compounds are not limited to specific mixing proportions and can be mixed in any proportions.

There is no restriction on the structure, type, and size of the separating membrane module to be subjected to the pervaporation method of the present invention, but preferably, the separating membrane module is a plate and frame type module, spiral type module or hollow filament type module.

EXAMPLES

The present invention will be further illustrated by way of specific examples, which are merely representative and do not restrict the scope of the present invention in any way.

In the examples, the permeating rate Q and separating coefficient α were determined in the following manner.

When a liquid organic compound mixture was subjected to a pervaporation method, a fraction was permeated through a separating membrane, liquefied by cooling, and then collected, and the weight of the liquefied fraction was measured. Then an internal standard liquid was added to the liquefied fraction, and the whole subjected to TCD-gas chromatography to determine the proportions in weight of organic compounds in the fraction to the total weight of the fraction.

The permeating rate Q and the separating coefficient α were determined in accordance with the equations:

$$Q = A/B$$

$$\alpha = C_2/C_1$$

as defined above.

In the examples, the compounds are represented by the following abbreviations.

(A) Tetracarboxylic dianhydride s-BPDA: 3,3',4,4'-biphenyltetracarboxylic dianhydride
a-BPDA: 2,3,3',4'-biphenyltetracarboxylic dianhydride
BTDA: 3,3',4,4',-benzophenonetetracarboxylic dianhydride,
ETDA: 3,3',4,4'-diphenylether tetracarboxylic dianhydride
PMDA: Pyromellitic dianhydride (B) Diamine TSN: Isomeric mixture of 2,8-dimethyl-3,7-diaminodibenzothiophene-5,5-dioxide, 2,6-dimethyl- 3,7-diaminodibenzothiophene-5,5-dioxide and 4,6-dimethyl-3,7-diaminodibenzothiophene-5,5-dioxide DMTX: Isomeric mixture of 2,8-dimethyl-3,7-diaminothioxanthene-5,5-dioxide, 2,6-dimethyl-3,7-diaminothioxanthene-5,5-dioxide and 4,6-dimethyl-3,7-diaminothioxanthene-5,5-dioxide DADE: 4,4'-diaminodiphenylether
DADM: 4,4'-diaminodiphenylmethane
TEP-Q: 1,4-bis(4-aminophenoxy)benzene
34IP: 3,4'-diamino-(2,2-diphenyl)propane
DABA: 3,5-diaminobenzoic acid
DAN: o-dianisidine
ADA: 9,10-bis(4-aminophenyl)anthracene
DAP: 2,6-diaminopyridine
MPP 2,5-dimethyl-p-phenylenediamine
MMP: 4,6-dimethyl-m-phenylenediamine
BAPS: 4,4'-di(4-aminophenoxy)diphenylsulfone
BAPB: 4,4'-di(4-aminophenoxy)biphenyl
BAPP: 2,2-bis[4-(4-aminophenoxy)phenyl] propane
HFPP: 2,2-bis[4-(4-aminophenoxy)phenyl] perfluoropropane

REFERENTIAL EXAMPLES 1 TO 17

In each of Referential Examples 1 to 17, an aromatic imide polymer solution was prepared by polymerizing and imidizing the aromatic tetracarboxylic acid component and the aromatic diamine component having the compositions as shown in Table 1, in substantially equal molar amounts, in the organic polar solvent consisting of p-chlorophenol at the polymerization temperature and for the polymerization time as shown in Table 1.

The resultant aromatic imide polymer solution had the polymer concentration and the solution viscosity, which is a rotation viscosity (poise) at a temperature of 100° C., as shown in Table 1.

The aromatic imide polymer solution was subjected, as a spinning dope solution, to a hollow filament-spinning process by using the coagulating liquid (ethyl alcohol aqueous solution) having the composition as indicated in Table 1, at a temperature of 0° C., the resultant hollow filaments were taken up at a speed of 10 m/min, washed with ethyl alcohol and with an aliphatic hydrocarbon (n-hexane), dried, and aged under the conditions as indicated in Table 1, for 30 minutes.

The resultant aromatic imide polymer hollow filaments (asymmetric membrane had) the outside diameter and the thickness as shown in Table 2.

The type of resultant hollow filament will be represented hereinafter by the number of the Referential Example in which the hollow filament was prepared.

TABLE 1

| Item Referential Example No. | Compositions of acid and diamine components ||||||||||||
|---|---|---|---|---|---|---|---|---|---|---|---|---|
| | Acid component (molar %) |||| Diamine component (molar %) ||||||||
| | BPDA | ETDA | BTDA | PMDA | TSN | DADE | DMTX | DADM | 34IP | TPE-Q | DABA | DAN |
| 1 (1) | 100 | — | — | — | 90 | 10 | — | — | — | — | — | — |
| 1 (2) | 100 | — | — | — | 90 | 10 | — | — | — | — | — | — |
| 1 (3) | 100 | — | — | — | 90 | 10 | — | — | — | — | — | — |
| 1 (4) | 100 | — | — | — | 90 | 10 | — | — | — | — | — | — |
| 1 (5) | 100 | — | — | — | 90 | 10 | — | — | — | — | — | — |
| 2 | 100 | — | — | — | 90 | 10 | — | — | — | — | — | — |
| 3 (1) | 100 | — | — | — | 70 | 30 | — | — | — | — | — | — |
| 3 (2) | 100 | — | — | — | 70 | 30 | — | — | — | — | — | — |
| 3 (3) | 100 | — | — | — | 70 | 30 | — | — | — | — | — | — |
| 4 (1) | 100 | — | — | — | 50 | 50 | — | — | — | — | — | — |
| 4 (2) | 100 | — | — | — | 50 | 50 | — | — | — | — | — | — |
| 4 (3) | 100 | — | — | — | 50 | 50 | — | — | — | — | — | — |
| 5 (1) | 100 | — | — | — | 30 | 70 | — | — | — | — | — | — |
| 5 (2) | 100 | — | — | — | 30 | 70 | — | — | — | — | — | — |
| 6 (1) | 80 | 20 | — | — | 90 | 10 | — | — | — | — | — | — |
| 6 (2) | 80 | 20 | — | — | 90 | 10 | — | — | — | — | — | — |
| 7 (1) | 80 | — | 20 | — | 90 | 10 | — | — | — | — | — | — |
| 7 (2) | 80 | — | 20 | — | 90 | 10 | — | — | — | — | — | — |
| 8 | 80 | — | 20 | — | 90 | 10 | — | — | — | — | — | — |
| 9 (1) | — | 100 | — | — | 90 | 10 | — | — | — | — | — | — |
| 9 (2) | — | 100 | — | — | 90 | 10 | — | — | — | — | — | — |
| 10 (1) | 100 | — | — | — | — | 30 | 70 | — | — | — | — | — |
| 10 (2) | 100 | — | — | — | — | 30 | 70 | — | — | — | — | — |
| 11 | 100 | — | — | — | 60 | — | — | 40 | — | — | — | — |
| 12 | 100 | — | — | — | — | 70 | — | — | 30 | — | — | — |
| 13 (1) | 100 | — | — | — | 90 | — | — | — | — | 10 | — | — |
| 13 (2) | 100 | — | — | — | 90 | — | — | — | — | 10 | — | — |
| 14 | 100 | — | — | — | 5 | 60 | — | 35 | — | — | — | — |
| 15 | 100 | — | — | — | — | 60 | — | 35 | — | — | 5 | — |
| 16 (1) | 85 | — | — | 15 | 90 | 10 | — | — | — | — | — | — |
| 16 (2) | 85 | — | — | 15 | 90 | 10 | — | — | — | — | — | — |
| 17 | 100 | — | — | — | — | 60 | — | — | — | — | — | 40 |

| Item Referential Example No. | Polymerization ||  Polymer solution || Coagulating liquid (EtOH aqueous solution) content of EtOH (vol. %) | Aging temperature (°C.) | Dimensions of hollow filament ||
|---|---|---|---|---|---|---|---|---|
| | Temperature (°C.) | Time (Hr) | Concentration (wt %) | Rotation viscosity (poise) | | | Outside Diameter (μm) | Thickness (μm) |
| 1 (1) | 180 | 8 | 15 | 2000 | 60 | 240 | 450 | 100 |
| 1 (2) | 180 | 8 | 15 | 2000 | 60 | 260 | 440 | 100 |
| 1 (3) | 180 | 8 | 15 | 2000 | 60 | 270 | 430 | 100 |

TABLE 1-continued

| | | | | | | | | |
|---|---|---|---|---|---|---|---|---|
| 1 (4) | 180 | 8 | 15 | 2000 | 60 | 290 | 430 | 100 |
| 1 (5) | 180 | 8 | 15 | 2000 | 60 | 320 | 430 | 90 |
| 2 | 180 | 8 | 15 | 2000 | 70 | 300 | 440 | 90 |
| 3 (1) | 180 | 12 | 15 | 1500 | 80 | 240 | 380 | 50 |
| 3 (2) | 180 | 12 | 15 | 1500 | 80 | 250 | 375 | 50 |
| 3 (3) | 180 | 12 | 15 | 1500 | 80 | 280 | 370 | 50 |
| 4 (1) | 180 | 15 | 15 | 1300 | 60 | 220 | 390 | 75 |
| 4 (2) | 180 | 15 | 15 | 1300 | 60 | 240 | 380 | 70 |
| 4 (3) | 180 | 15 | 15 | 1300 | 60 | 270 | 370 | 70 |
| 5 (1) | 180 | 10 | 15 | 1800 | 60 | 220 | 360 | 70 |
| 5 (2) | 180 | 10 | 15 | 1800 | 60 | 270 | 350 | 70 |
| 6 (1) | 180 | 20 | 15 | 1500 | 60 | 240 | 350 | 70 |
| 6 (2) | 180 | 20 | 15 | 1500 | 60 | 320 | 330 | 70 |
| 7 (1) | 180 | 20 | 15 | 1000 | 80 | 240 | 370 | 70 |
| 7 (2) | 180 | 20 | 15 | 1000 | 80 | 320 | 340 | 70 |
| 8 | 180 | 20 | 15 | 1000 | 60 | 220 | 380 | 70 |
| 9 (1) | 180 | 25 | 17 | 1200 | 80 | 180 | 320 | 70 |
| 9 (2) | 180 | 25 | 17 | 1200 | 80 | 280 | 290 | 65 |
| 10 (1) | 180 | 16 | 16 | 1000 | 70 | 240 | 320 | 70 |
| 10 (2) | 180 | 16 | 16 | 1000 | 70 | 280 | 310 | 70 |
| 11 | 180 | 8 | 19 | 2000 | 70 | 200 | 480 | 90 |
| 12 | 180 | 12 | 18 | 2300 | 70 | 220 | 340 | 70 |
| 13 (1) | 180 | 10 | 15 | 1800 | 70 | 240 | 350 | 70 |
| 13 (2) | 180 | 10 | 15 | 1800 | 70 | 300 | 330 | 60 |
| 14 | 180 | 7 | 19 | 3000 | 70 | 200 | 360 | 70 |
| 15 | 180 | 8 | 19 | 2500 | 70 | 200 | 370 | 80 |
| 16 (1) | 180 | 20 | 15 | 1000 | 70 | 240 | 380 | 65 |
| 16 (2) | 180 | 20 | 15 | 1000 | 70 | 300 | 375 | 65 |
| 17 | 180 | 8 | 19 | 2500 | 70 | 200 | 370 | 80 |

EXAMPLES 1 TO 32

In each of Examples 1 to 32, 4 hollow filaments of the type shown in Table 2 and having a length of 7.5 cm were arranged in parallel to each other to form a hollow filament bundle, and at one end of the bundle, the ends of the hollow filaments were sealed with an epoxy resin to provide a hollow filament bundle element.

The hollow filament bundle element was placed in a container having an inlet for feeding a liquid organic compound mixture, an outlet for recovering a non-permeated fraction, and an outlet for collecting a permeated fraction, to provide a separating membrane module. A liquid organic compound mixture having the composition as shown in Table 2 was fed into the separating membrane module so that the mixture came into contact with the outside peripheral surfaces of the hollow filaments. The hollow spaces of the hollow filaments were connected to a pressure-reducing or vacuum apparatus, and the pressure in the hollow spaces was reduced to 3 Torr or less, to cause a specific (fraction) organic compound to be selectively permeated through the hollow filaments. The permeated fraction in the state of a vapor was cooled, and the resultant liquefied fraction was collected.

The permeating rate Q of the permeated fraction through the hollow filaments and the separating coefficient α of the hollow filaments are shown in Table 2.

EXAMPLES 33 TO 35

The aromatic imide polymer hollow filaments prepared in Referential Example 1 were immersion-treated in benzene in Example 33, in a benzene-cyclohexane mixture (weight ratio: 1:1) in Example 34, and in a benzene-n-hexane mixture (weight ratio: 1:1) in Example 35, at a temperature of 150° C. for 50 hours.

The treated hollow filaments were dried at a temperature of 30° C. for 20 hours.

The dried hollow filaments were subjected to the same separating procedures as those in Example 1. The results are shown in Table 2.

TABLE 2

| | | Separating property of hollow filament | | | | | | | | | | |
|---|---|---|---|---|---|---|---|---|---|---|---|---|
| Item | | Benzene-cyclohexane (Cx) mixture (weight ratio: 1:1) | | | Benzene-n-hexane mixture (weight ratio: 1:1) | | | Ethylalcohol-cyclohexane mixture (weight ratio 1:1) | | | Trichloromethane-n-hexane mixture (weight ratio: 1:1) | | |
| Example No. | Type of hollow filament (*)1 | Temperature °C. | Permeating rate Q kg/m²Hr | Separating coefficient α Benzene Cx | Temperature °C. | Permeating rate Q kg/m²Hr | Separating coefficient α Benzene n-hexane | Temperature °C. | Permeating rate Q kg/m²Hr | Separating coefficient EtOH Cx | Temperature °C. | Permeating rate Q kg/m²Hr | Separating coefficient α CHCl$_3$ n-hexane |
| 1 | (1) | 73 | 1.26 | 20.3 | — | — | — | — | — | — | — | — | — |
| 2 | 1 (2) | 73 | 0.72 | 31.4 | — | — | — | — | — | — | — | — | — |
| 3 | 1 (3) | — | — | — | 73 | 1.11 | 10.9 | — | — | — | — | — | — |
| 4 | 1 (4) | — | — | — | 73 | 0.36 | 20.7 | — | — | — | — | — | — |
| 5 | 1 (5) | — | — | — | — | — | — | 90 | 1.10 | 6580 | — | — | — |
| 6 | 2 | — | — | — | — | — | — | — | — | — | 60 | 0.41 | 12.5 |
| 7 | 3 (1) | 73 | 0.43 | 69.4 | — | — | — | — | — | — | — | — | — |
| 8 | 3 (2) | — | — | — | 73 | 0.95 | 10.3 | — | — | — | — | — | — |
| 9 | 3 (3) | — | — | — | — | — | — | 90 | 1.23 | 94 | 60 | 0.58 | 13.6 |
| 10 | 4 (1) | 73 | 0.30 | 98.5 | — | — | — | — | — | — | — | — | — |
| 11 | 4 (2) | 73 | 1.08 | 21.2 | — | — | — | — | — | — | — | — | — |
| 12 | 4 (3) | — | — | — | — | — | — | 90 | 3.27 | 76 | 60 | 0.14 | 17.2 |
| 13 | 5 (1) | 73 | 0.22 | 112 | — | — | — | — | — | — | — | — | — |
| 14 | 5 (2) | — | — | — | — | — | — | 90 | 2.78 | 72 | 60 | 0.11 | 18.3 |

TABLE 2-continued

| | | Separating property of hollow filament | | | | | | | | | | |
|---|---|---|---|---|---|---|---|---|---|---|---|---|
| | | Benzene-cyclohexane (Cx) mixture (weight ratio: 1:1) | | | Benzene-n-hexane mixture (weight ratio: 1:1) | | | Ethylalcohol-cyclohexane mixture (weight ratio 1:1) | | | Trichloromethane-n-hexane mixture (weight ratio: 1:1) | | |
| Item | | | | | | | | | | | | | |
| Example No. | Type of hollow filament (*)$_1$ | Temperature °C. | Permeating rate Q kg/m$^2$Hr | Separating coefficient $\alpha$ Benzene/Cx | Temperature °C. | Permeating rate Q kg/m$^2$Hr | Separating coefficient $\alpha$ Benzene/n-hexane | Temperature °C. | Permeating rate Q kg/m$^2$Hr | Separating coefficient $\alpha$ EtOH/Cx | Temperature °C. | Permeating rate Q kg/m$^2$Hr | Separating coefficient $\alpha$ CHCl$_3$/n-hexane |
| 15 | 6 (1) | 73 | 0.61 | 22.5 | — | — | — | — | — | — | — | — | — |
| 16 | 6 (2) | — | — | — | — | — | — | 90 | 0.48 | 304 | — | — | — |
| 17 | 7 (1) | 73 | 0.39 | 42.9 | — | — | — | — | — | — | — | — | — |
| 18 | 7 (2) | — | — | — | — | — | — | 90 | 0.61 | 129 | — | — | — |
| 19 | 8 | 73 | 0.15 | 275 | — | — | — | — | — | — | — | — | — |
| 20 | 9 (1) | 73 | 0.44 | 36.8 | — | — | — | — | — | — | — | — | — |
| 21 | 9 (2) | — | — | — | — | — | — | 90 | 0.32 | 350 | — | — | — |
| 22 | 10 (1) | 73 | 0.82 | 21.3 | — | — | — | — | — | — | — | — | — |
| 23 | 10 (2) | — | — | — | — | — | — | 90 | 0.53 | 238 | — | — | — |
| 24 | 11 | — | — | — | — | — | — | 90 | 0.41 | 15.3 | — | — | — |
| 25 | 12 | — | — | — | — | — | — | 90 | 0.60 | 25.2 | 60 | 0.32 | 11.9 |
| 26 | 13 (1) | 73 | 0.53 | 22.7 | — | — | — | — | — | — | — | — | — |
| 27 | 13 (2) | — | — | — | — | — | — | 90 | 0.42 | 5000 | 60 | 0.40 | 15.9 |
| 28 | 14 | — | — | — | — | — | — | 90 | 0.48 | 990 | — | — | — |
| 29 | 15 | — | — | — | — | — | — | 90 | 1.10 | 208 | — | — | — |
| 30 | 16 (1) | 73 | 0.15 | 50.8 | — | — | — | — | — | — | — | — | — |
| 31 | 16 (2) | — | — | — | — | — | — | 90 | 1.05 | 42 | — | — | — |
| 32 | 17 | — | — | — | — | — | — | 90 | 2.49 | 23 | 60 | 0.65 | 13.3 |
| 33 | 1 (1) | 73 | 1.18 | 19.5 | — | — | — | — | — | — | — | — | — |
| 34 | 1 (1) | 73 | 1.12 | 22.1 | — | — | — | — | — | — | — | — | — |
| 35 | 1 (1) | 73 | 0.80 | 25.3 | — | — | — | — | — | — | — | — | — |

Note:
(*)$_1$ ... The type of the hollow filaments are represented by the numbers of Referential Examples in which the hollow filaments were prepared.

COMPARATIVE REFERENTIAL EXAMPLE 1

A three necked separable flask was charged with 60 m mole of pyromellitic dianhydride, 60 m mole of 4,4'-diaminodiphenylether, and 200 g of N-methyl pyrrolidone, and these acid and diamine compounds were polymerized at a temperature of 20° C. for 10 hours while flowing nitrogen gas through the flask, to produce a polyamic acid.

To the polymerization mixture was added 200 g of N-methyl pyrrolidone, 27 g of pyridine, and 35 g of acetic anhydride, the admixture was heated by gradually raising the temperature to 80° C. and maintaining the temperature at 80° C. for one hour, while vigorously agitating, to imidize the polyamic acid, and the resultant imide polymer was deposited.

To the reaction mixture was further added ethyl alcohol, to completely deposit the resultant imide polymer. The deposited imide polymer was collected by filtration, washed with ethyl alcohol, and dried under a reduced pressure to provide a dried aromatic imide polymer powder.

To the resultant aromatic imide polymer powder was added p-chlorophenol, and the resultant mixture was heated to dissolve the powder. The imide polymer powder substantially did not dissolve in p-chlorophenol.

The same procedures as mentioned above were repeated except that p-chlorophenol was replaced by N-methyl-2-pyrrolidone. The imide polymer powder was not dissolved in N-methyl-2-pyrrolidone.

Also, the same procedures as mentioned above were carried out except that p-chlorophenol was replaced by N,N-dimethylacetamide. The imide polymer powder was not dissolved in the N,N-dimethylacetamide.

Accordingly, the aromatic imide polymer prepared by using pyromellitic dianhydride could not be utilized to produce a separating asymmetric membrane.

COMPARATIVE REFERENTIAL EXAMPLES 2 to 4

The same procedures as in Referential Example 1-(1) were carried out except that the mixture of TSN and DADE was replaced by p-phenylenediamine in Comparative Referential Example 2, by 2,4-dimethyl-m-phenylenediamine in Comparative Referential Example 3, and by 2,6-diaminopyridine in Comparative Referential Example 4, each in an equimolar amount to 3,3',4,4'-biphenyltetracarboxylic dianhydride, and the reaction components were polymerized in an organic polar solvent consisting of p-chlorophenol, at a temperature of 180° C. for 6 hours. The resultant polymers could not be dissolved in p-chlorophenol, and thus were deposited from the reaction mixture.

The resultant polymer powders could not be dissolved in any organic solvents, and thus it was impossible to prepare dope solutions containing the polymers.

COMPARATIVE EXAMPLE 1

A conventional solvent soluble aromatic imide polymer (available under the trademark of Ultem, from General Electric Co.) in an amount of 10 parts by weight was dissolved in a mixture of 40 parts by weight of N-methyl-2-pyrrolidone and 50 parts by weight of tetrahydrofuran, in a separable flask by stirring. A uniform polymer solution was obtained.

The polymer solution was spread on a horizontal smooth surface of a flat glass plate by using a doctor blade to form a polymer solution layer having a thickness of 0.2 mm.

The polymer solution layer on the glass plate was immersed in distilled water at room temperature for one hour to form an asymmetric membrane, and the membrane was separated from the glass plate and dried at 30° C. to provide an asymmetric membrane.

The resultant membrane was employed to separate a mixture of chloroform with n-hexane in a molar ratio of 1:1 by a pervaporation method.

Example 19-(1) was used and the immersion time was 20 hours.

The results are shown in Table 4.

TABLE 3

| Item Referential Example No. | Composition of acid and diamine components | | | | | Polymerization | | Polymer solution | | Coagulating liquid EtOH aqueous solution | | Aging temperature (°C.) | Dimension of hollow filament | |
|---|---|---|---|---|---|---|---|---|---|---|---|---|---|---|
| | Acid component (molar %) | | | Diamine component (molar %) | | Temperature (°C.) | Time (Hr) | Concentration (wt %) | Rotation viscosity (poise) | Content of EtOH (vol. %) | Temperature (°C.) | | Outside diameter (μm) | Thickness (μm) |
| | s-BPDA | a-BPDA | ETDA | ADA | DADE | | | | | | | | | |
| 18 | — | 100 | — | 100 | — | 180 | 30 | 17 | 1200 | 55 | 0 | 400 | 300 | 60 |
| 19 (1) | 100 | — | — | 30 | 70 | 180 | 7 | 17 | 1600 | 55 | 0 | 240 | 320 | 60 |
| 19 (2) | 100 | — | — | 30 | 70 | 180 | 7 | 17 | 1600 | 55 | 0 | 280 | 310 | 60 |
| 20 (1) | 80 | — | 20 | 30 | 70 | 180 | 15 | 17 | 1200 | 55 | 0 | 230 | 350 | 70 |
| 20 (2) | 80 | — | 20 | 30 | 70 | 180 | 15 | 17 | 1200 | 55 | 0 | 260 | 340 | 70 |

TABLE 4

| | | Item Separating property of hollow filament | | | | | |
|---|---|---|---|---|---|---|---|
| | | Benzene-cyclohexane (Cx) mixture (weight ratio: 1:1) | | | Ethylalcohol-cyclohexane (Cx) mixture (weight ratio: 1:1) | | |
| Example No. | Type of hollow filament | Temperature °C. | Permeating rate Q kg/m²·Hr | Separating coefficient α Benzene/Cx | Temperature °C. | Permeating rate Q kg/m²·Hr | Separating coefficient α EtOH/Cx |
| 36 | 18 | 20 | 0.48 | 10.3 | 60 | 0.54 | 35.8 |
| 37 | 19 (1) | 73 | 0.64 | 24.4 | — | — | — |
| 38 | 19 (2) | — | — | — | 90 | 0.26 | 65.1 |
| 39 | 20 (1) | 73 | 0.52 | 23.3 | — | — | — |
| 40 | 20 (2) | — | — | — | 90 | 0.22 | 54.8 |
| 41 | 19 (1) | 73 | 0.72 | 21.3 | — | — | — |

It was found that the membrane become swollen in the chloroform-n-hexane mixture, and therefore, did not exhibit a stable and constant separating property.

REFERENTIAL EXAMPLES 18 TO 20

In each of Referential Examples 18 to 20, the same procedures as those mentioned in Referential Example 1-(1) were carried out except that the compositions of the acid and diamine components, the polymerization temperature and time, the concentration and rotation viscosity of the polymer solution at 100° C., the temperature and content of ethyl alcohol of the coagulating liquid, and the aging temperature were as shown in Table 3, and the resultant hollow filament had the outside diameter and thickness as shown in Table 3.

EXAMPLES 36 TO 40

In each of Examples 36 to 40, the same procedures as mentioned in Example 1 were carried out except that the aromatic imide polymer hollow filament and the organic compound mixture as indicated in Table 4 were employed.

The results are shown in Table 4.

EXAMPLE 41

The same procedures as described in Example 34 were carried out except that the aromatic imide polymer asymmetric membrane prepared in Referential Example 19-(1) was used and the immersion time was 20 hours.

The results are shown in Table 4.

REFERENTIAL EXAMPLES 21 TO 24

In each of Referential Examples 21 to 24, the same procedures as those mentioned in Referential Example 1-(1) were carried out except that the compositions of the acid and diamine components, the polymerization temperature and time, the concentration and rotation viscosity of the polymer solution at 100° C., the temperature and content of ethyl alcohol of the coagulating liquid, and the aging temperature were as shown in Table 5 and the resultant hollow filament had the outside diameter and thickness as shown in Table 5.

EXAMPLES 42 TO 47

In each of Examples 42 to 47, the same procedures as mentioned in Example 1 were carried out except that the aromatic imide polymer hollow filament and the organic compound mixture as indicated in Table 6 were employed.

The results are shown in Table 6.

EXAMPLE 48

The same procedures as described in Example 33 were carried out except that benzene was replaced by a chloroform-n-hexane mixture in a weight ratio of 1:1, the aromatic imide polymer asymmetric membrane prepared in Referential Example 22-(2) was used and the immersion was carried out at a temperature of 120° C. for 20 hours.

The results are shown in Table 6.

TABLE 5

| Item Referential Example No. | Composition of acid and diamine components | | | | Polymerization | | Polymer solution | | Coagulating liquid EtOH aqueous solution | | Aging temperature (°C.) | Dimension of hollow filament | |
|---|---|---|---|---|---|---|---|---|---|---|---|---|---|
| | Acid component (molar %) | | Diamine component (molar %) | | Temperature (°C.) | Time (Hr) | Concentration (wt %) | Rotation viscosity (poise) | Content of EtOH (vol. %) | Temperature (°C.) | | Outside diameter (μm) | Thickness (μm) |
| | s-BPDA | ETDA | BAPS | DADE | | | | | | | | | |
| 21 (1) | 100 | — | 100 | — | 180 | 10 | 23 | 1500 | 70 | 0 | 180 | 350 | 70 |
| 21 (2) | 100 | — | 100 | — | 180 | 10 | 23 | 1500 | 70 | 0 | 220 | 340 | 70 |
| 22 (1) | 100 | — | 80 | 20 | 180 | 8 | 21 | 1500 | 80 | 0 | 180 | 340 | 70 |
| 22 (2) | 100 | — | 80 | 20 | 180 | 8 | 21 | 1500 | 80 | 0 | 210 | 330 | 70 |
| 23 | 100 | — | 50 | 50 | 180 | 8 | 21 | 1700 | 70 | 0 | 190 | 360 | 70 |
| 24 | 80 | 20 | 80 | 20 | 180 | 14 | 22 | 1300 | 70 | 0 | 180 | 340 | 75 |

TABLE 6

| | | Separating property of hollow filament | | | | |
|---|---|---|---|---|---|---|
| Item | | Ethylalcohol-cyclohexane (Cx) mixture (weight ratio: 1:1) | | | Trichloromethane-n-hexane mixture (weight ratio: 1:1) | |
| Example No. | Type of hollow filament | Temperature °C. | Permeating rate Q kg/m² · Hr | Separating coefficient α EtOH Cx | Temperature °C. | Permeating rate Q kg/m² · Hr | Separating coefficient α CHCl₃ n-hexane |
| 42 | 21 (1) | 90 | 2.34 | 19.8 | — | — | — |
| 43 | 21 (2) | — | — | — | 60 | 0.65 | 10.8 |
| 44 | 22 (1) | 90 | 3.56 | 21.2 | — | — | — |
| 45 | 22 (2) | — | — | — | 60 | 0.72 | 12.3 |
| 46 | 23 | 90 | 2.72 | 20.3 | — | — | — |
| 47 | 24 | 90 | 2.32 | 22.5 | — | — | — |
| 48 | 22 (2) | — | — | — | 60 | 0.65 | 11.5 |

REFERENTIAL EXAMPLES 25 TO 29

In each of Referential Examples 25 to 29, the same procedures as those mentioned in Referential Example 1-(1) were carried out except that the compositions of the acid and diamine components, the polymerization temperature and time, the concentration and rotation viscosity of the polymer solution at 100° C., the temperature and content of ethyl alcohol of the coagulating liquid, and the aging temperature were as shown in Table 7, and the resultant hollow filament had the outside diameter and thickness as shown in Table 7.

EXAMPLES 49 TO 53

In each of Examples 49 to 53, the same procedures as mentioned in Example 1 were carried out except that the aromatic imide polymer hollow filament and the organic compound mixture as indicated in Table 8 were employed.

The results are shown in Table 8.

EXAMPLE 54

The same procedures as described in Example 33 were carried out except that benzene was replaced by an ethylalcohol-cyclohexane mixture in a weight ratio of 1:1 the aromatic imide polymer asymmetric membrane prepared in Referential Example 26 was used and the immersion was carried out at a temperature of 130° C. for 20 hours.

The results are shown in Table 8.

TABLE 7

| Item Referential Example No. | Composition of acid and diamine components | | | | Polymerization | | Polymer solution | | Coagulating liquid EtOH aqueous solution | | Aging temperature (°C.) | Dimension of hollow filament | |
|---|---|---|---|---|---|---|---|---|---|---|---|---|---|
| | Acid component (molar %) | | Diamine component (molar %) | | Temperature (°C.) | Time (Hr) | Concentration (wt %) | Rotation viscosity (poise) | Content of EtOH (vol. %) | Temperature (°C.) | | Outside diameter (μm) | Thickness (μm) |
| | s-BPDA | ETDA | BAPA | DADE | | | | | | | | | |
| 25 | 100 | — | 100 | — | 180 | 6 | 17 | 2000 | 70 | 0 | 200 | 340 | 70 |
| 26 | 100 | — | 100 | — | 180 | 6 | 17 | 2000 | 70 | 0 | 220 | 330 | 70 |
| 27 | 100 | — | 30 | 70 | 180 | 10 | 17 | 1500 | 60 | 0 | 180 | 350 | 70 |
| 28 | 100 | — | 30 | 70 | 180 | 10 | 17 | 1500 | 60 | 0 | 220 | 330 | 70 |
| 29 | 80 | 20 | 30 | 70 | 180 | 12 | 17 | 1800 | 70 | 0 | 180 | 320 | 70 |

TABLE 8

| | | Separating property of hollow filament | | | | | | | |
|---|---|---|---|---|---|---|---|---|---|
| | | Benzene-cyclohexane (Cx) mixture (weight ratio: 1:1) | | | Ethylalcohol-cyclohexane mixture (weight ratio: 1:1) | | | Trichloromethane-n-hexane mixture (weight ratio: 1:1) | | |
| Example No. | Type of hollow filament | Temperature °C. | Permeating rate Q kg/m² Hr | Separating coefficient α Benzene/Cx | Temperature °C. | Permeating rate Q kg/m² Hr | Separating coefficient α EtOH/Cx | Temperature °C. | Permeating rate Q kg/m² Hr | Separating coefficient α CHCl₃/n-hexane |
| 49 | 25 | 73 | 0.12 | 17.1 | — | — | — | — | — | — |
| 50 | 26 | — | — | — | 90 | 0.74 | 219 | 60 | 0.72 | 10.3 |
| 51 | 27 | 73 | 0.41 | 33.4 | 90 | 1.75 | 93.4 | 60 | 1.50 | 11.0 |
| 52 | 28 | — | — | — | 90 | 0.26 | 136 | — | — | — |
| 53 | 29 | 73 | 0.25 | 27.3 | 90 | 0.53 | 31.5 | 60 | 0.42 | 10.5 |
| 54 | 26 | — | — | — | 90 | 0.65 | 300 | — | — | — |

REFERENTIAL EXAMPLES 30 TO 35

In each of Referential Examples 30 to 35, the same procedures as those mentioned in Referential Example 1-(1) were carried out except that the compositions of the acid and diamine components, the polymerization temperature and time, the concentration and rotation viscosity of the polymer solution at 100° C., the temperature and content of ethyl alcohol of the coagulating liquid, and the aging temperature were as shown in Table 9, and the resultant hollow filament had the outside diameter and thickness as shown in Table 9.

EXAMPLES 55 TO 67

In each of Examples 55 to 67, the same procedures as mentioned in Example 1 were carried out except that the aromatic imide polymer hollow filament and the organic compound mixture as indicated in Table 10 were employed.

The results are shown in Table 10.

EXAMPLE 68

The same procedures as described in Example 33 were carried out except that benzene was replaced by a chloroform-n-hexane mixture in a weight ratio of 1:1, and the aromatic imide polymer asymmetric membrane prepared in Referential Example 31-(2) was used.

The results are shown in Table 10.

TABLE 9

| Referential Example No. | Composition of acid and diamine components | | | | | Polymerization | | Polymer solution | | Coagulating liquid EtOH aqueous solution | | Aging temperature (°C.) | Dimension of hollow filament | |
|---|---|---|---|---|---|---|---|---|---|---|---|---|---|---|
| | Acid component (molar %) | | Diamine component (molar %) | | | Temperature (°C.) | Time (Hr) | Concentration (wt %) | Rotation viscosity (poise) | Content of EtOH (vol. %) | Temperature (°C.) | | Outside diameter (μm) | Thickness (μm) |
| | s-BPDA | ETDA | BAPP | HFPP | DADE | | | | | | | | | |
| 30 (1) | 100 | — | 70 | — | 30 | 180 | 8 | 17 | 1300 | 70 | 0 | 190 | 340 | 70 |
| 30 (2) | 100 | — | 70 | — | 30 | 180 | 8 | 17 | 1300 | 70 | 0 | 210 | 340 | 70 |
| 31 (1) | 100 | — | 30 | — | 70 | 180 | 8 | 17 | 1200 | 70 | 0 | 200 | 360 | 70 |
| 31 (2) | 100 | — | 30 | — | 70 | 180 | 8 | 17 | 1200 | 70 | 0 | 210 | 360 | 70 |
| 32 | 80 | 20 | 30 | — | 70 | 180 | 12 | 18 | 1500 | 70 | 0 | 200 | 320 | 70 |
| 33 (1) | 100 | — | — | 100 | — | 180 | 30 | 18 | 1500 | 60 | 0 | 200 | 360 | 50 |
| 33 (2) | 100 | — | — | 100 | — | 180 | 30 | 18 | 1500 | 60 | 0 | 220 | 360 | 50 |
| 33 (3) | 100 | — | — | 100 | — | 180 | 30 | 18 | 1500 | 60 | 0 | 240 | 350 | 50 |
| 34 (1) | 100 | — | — | 30 | 70 | 180 | 20 | 17 | 1800 | 60 | 0 | 200 | 360 | 80 |
| 34 (2) | 100 | — | — | 30 | 70 | 180 | 20 | 17 | 1800 | 60 | 0 | 220 | 360 | 80 |
| 34 (3) | 100 | — | — | 30 | 70 | 180 | 20 | 17 | 1800 | 60 | 0 | 250 | 340 | 70 |
| 35 (1) | 80 | 20 | — | 100 | — | 180 | 35 | 18 | 1200 | 60 | 0 | 210 | 360 | 70 |
| 35 (2) | 80 | 20 | — | 100 | — | 180 | 35 | 18 | 1200 | 60 | 0 | 240 | 350 | 70 |

TABLE 10

| | | Separating property of hollow filament | | | | | | | | |
|---|---|---|---|---|---|---|---|---|---|---|
| | | Benzene-cyclohexane (Cx) mixture (weight ratio: 1:1) | | | Ethylalcohol-cyclohexane (Cx) mixture (weight ratio: 1:1) | | | Trichloromethane-n-hexane mixture (weight ratio: 1:1) | | |
| Example No. | Type of hollow filament | Temperature °C. | Permeating rate Q kg/m² Hr | Separating coefficient α Benzene/Cx | Temperature °C. | Permeating rate Q kg/m² Hr | Separating coefficient α EtOH/Cx | Temperature °C. | Permeating rate Q kg/m² Hr | Separating coefficient α CHCl₃/n-hexane |
| 55 | 30 (1) | — | — | — | 90 | 0.72 | 92 | — | — | — |
| 56 | 30 (2) | — | — | — | — | — | — | 60 | 0.68 | 12.5 |
| 57 | 31 (1) | — | — | — | 90 | 0.74 | 100 | — | — | — |
| 58 | 31 (2) | — | — | — | — | — | — | 60 | 0.75 | 12.2 |
| 59 | 32 | — | — | — | 90 | 0.65 | 85 | — | — | — |

TABLE 10-continued

| | | Separating property of hollow filament | | | | | | | |
|---|---|---|---|---|---|---|---|---|---|
| | | Benzene-cyclohexane (Cx) mixture (weight ratio: 1:1) | | | Ethylalcohol-cyclohexane (Cx) mixture (weight ratio: 1:1) | | | Trichloromethane-n-hexane mixture (weight ratio: 1:1) | | |
| Example No. | Type of hollow filament | Temperature °C. | Permeating rate Q kg/m² Hr | Separating coefficient α Benzene/Cx | Temperature °C. | Permeating rate Q kg/m² Hr | Separating coefficient α EtOH/Cx | Temperature °C. | Permeating rate Q kg/m² Hr | Separating coefficient α CHCl₃/n-hexane |
| 60 | 33 (1) | — | — | — | 90 | 1.79 | 27.6 | — | — | — |
| 61 | 33 (2) | — | — | — | 90 | 0.74 | 37.5 | 60 | 0.57 | 12.2 |
| 62 | 33 (3) | 73 | 0.75 | 15.3 | — | — | — | — | — | — |
| 63 | 34 (1) | — | — | — | 90 | 1.02 | 29.5 | — | — | — |
| 64 | 34 (2) | — | — | — | — | — | — | 60 | 0.42 | 12.5 |
| 65 | 34 (3) | 73 | 0.54 | 19.8 | — | — | — | — | — | — |
| 66 | 35 (1) | — | — | — | 90 | 1.22 | 23.2 | — | — | — |
| 67 | 35 (2) | 73 | 0.47 | 21.3 | — | — | — | — | — | — |
| 68 | 31 (2) | — | — | — | — | — | — | 60 | 0.60 | 11.0 |

REFERENTIAL EXAMPLES 36 TO 42

In each of Referential Examples 36 to 42, the same procedures as those mentioned in Referential Example 1-(1) were carried out except that the compositions of the acid and diamine components, the polymerization temperature and time, the concentration and rotation viscosity of the polymer solution at 100° C., the temperature and content of ethyl alcohol of the coagulating liquid, and the aging temperature were as shown in Table 11, and the resultant hollow filament had the outside diameter and thickness as shown in Table 11.

EXAMPLES 69 TO 77

In each of Examples 69 to 77, the same procedures as mentioned in Example 1 were carried out except that the aromatic imide polymer hollow filament and the organic compound mixture as indicated in Table 12 were employed.

The results are shown in Table 12.

EXAMPLE 78

The same procedures as described in Example 34 were carried out except that the aromatic imide polymer asymmetric membrane prepared in Referential Example 39 was used and the immersion time was 20 hours.

The results are shown in Table 12.

TABLE 11

| Referential Example No. | Composition of acid and diamine components | | | | | | | | Polymerization | | Polymer solution | |
|---|---|---|---|---|---|---|---|---|---|---|---|---|
| | Acid component (molar %) | Diamine component (molar %) | | | | | | | Temperature (°C.) | Time (Hr) | Concentration (wt %) | Rotation viscosity (poise) |
| | s-BPDA | DABA | DAP | MMP | MPP | DADE | DADM | TSN | | | | |
| 36 | 100 | 30 | — | — | — | 60 | 10 | — | 180 | 8.5 | 17 | 1700 |
| 37 | 100 | 20 | — | — | — | 80 | — | — | 180 | 6 | 15 | 1400 |
| 38 | 100 | — | 30 | — | — | 70 | — | — | 180 | 10 | 17 | 3000 |
| 39 | 100 | — | — | 30 | — | 70 | — | — | 180 | 12 | 16 | 1500 |
| 40 (1) | 100 | — | — | — | 30 | 70 | — | — | 180 | 12 | 16 | 1700 |
| 40 (2) | 100 | — | — | — | 30 | 70 | — | — | 180 | 12 | 16 | 1700 |
| 41 | 100 | — | — | 50 | — | 50 | — | — | 180 | 10 | 16 | 2300 |
| 42 (1) | 100 | 40 | — | — | — | — | — | 60 | 180 | 12 | 15 | 2000 |
| 42 (2) | 100 | 40 | — | — | — | — | — | 60 | 180 | 12 | 15 | 2000 |

| Referential Example No. | Coagulating liquid EtOH aqueous solution | | Aging temperature (°C.) | Dimension of hollow filament | |
|---|---|---|---|---|---|
| | Content of EtOH (vol %) | Temperature (°C.) | | Outside diameter (μm) | Thickness (μm) |
| 36 | 60 | 0 | 240 | 380 | 90 |
| 37 | 60 | 0 | 240 | 360 | 70 |
| 38 | 70 | 0 | 220 | 350 | 90 |
| 39 | 70 | 0 | 220 | 360 | 60 |
| 40 (1) | 70 | 0 | 220 | 360 | 60 |
| 40 (2) | 70 | 0 | 190 | 380 | 60 |
| 41 | 70 | 0 | 220 | 340 | 60 |
| 42 (1) | 70 | 0 | 240 | 370 | 60 |
| 42 (2) | 70 | 0 | 280 | 360 | 60 |

TABLE 12

| | | Separating property of hollow filament | | | | | | | |
|---|---|---|---|---|---|---|---|---|---|
| | | Benzene-cyclohexane (Cx) mixture (weight ratio: 1:1) | | | Ethylalcohol-cyclohexane mixture (weight ratio: 1:1) | | | Trichloromethane-n-hexane mixture (weight ratio: 1:1) | | |
| Example No. | Type of hollow filament | Temperature °C. | Permeating rate Q kg/m² Hr | Separating coefficient $\alpha$ $\frac{Benzene}{Cx}$ | Temperature °C. | Permeating rate Q kg/m² Hr | Separating coefficient $\alpha$ $\frac{EtOH}{Cx}$ | Temperature °C. | Permeating rate Q kg/m² Hr | Separating coefficient $\alpha$ $\frac{CHCl_3}{n\text{-hexane}}$ |
| 69 | 36 | — | — | — | 90 | 5.1 | 57.9 | 60 | 0.25 | 34.4 |
| 70 | 37 | — | — | — | 90 | 4.7 | 48.3 | 60 | 0.21 | 35.3 |
| 71 | 38 | — | — | — | 90 | 0.56 | 216 | — | — | — |
| 72 | 39 | 73 | 0.29 | 36.1 | 90 | 1.8 | 148 | — | — | — |
| 73 | 40 (1) | — | — | — | 90 | 0.25 | 176 | — | — | — |
| 74 | 40 (2) | 73 | 0.25 | 27.9 | — | — | — | — | — | — |
| 75 | 41 | 73 | 0.25 | 30.2 | 90 | 0.81 | 103 | — | — | — |
| 76 | 42 (1) | 73 | 0.42 | 53.2 | — | — | — | — | — | — |
| 77 | 42 (2) | — | — | — | 90 | 1.35 | 123 | — | — | — |
| 78 | 39 | 73 | 0.36 | 32.3 | — | — | — | — | — | — |

We claim:

1. A method comprising: separating a liquid organic compound mixture which forms azeotropes, by pervaporation, further by,
   bringing a mixture of two or more types of organic compounds in the state of a liquid into contact with one face of an aromatic imide polymer asymmetric membrane which comprises a solvent soluble polymerization product of:
   (A) an aromatic tetracarboxylic acid component comprising
      (a) 70 to 100 molar % of at least one principal member selected from the group consisting of biphenyl tetracarboxylic acids, diphenylether tetracarboxylic acids, and dianhydrides, esters and salts of the above-mentioned acids, and
      (b) 0 to 30 molar % of at least one additional member selected from the group consisting of aromatic tetracarboxylic acids, and dianhydrides, esters and salts of those acids which are different from the above-mentioned compounds for the principal member; with
   (B) an aromatic diamine component comprising at least one member selected from the group consisting of:
      (c) an ingredient comprising:
         (i) 85 to 100 molar % of at least one principal member selected from aromatic diamines having 2 to 3 benzene ring structures, and
         (ii) 0 to 15 molar % of at least one member selected from aromatic diamines other than the above-mentioned diamines (i) for the principal member;
      (d) an ingredient comprising:
         (iii) 15 to 100 molar % of at least one member selected from the group consisting of 9,10-di(aminophenyl)anthracene compounds, di(aminophenoxy) diphenylsulfone compounds, di(aminophenoxy)biphenyl compounds, and di(aminophenoxy) diphenylalkane compounds,
         (iv) 0 to 85 molar % of least one member selected from aromatic diamines having 2 to 3 benzene ring structures, and
         (v) 0 to 15 molar % of at least one member selected from aromatic diamines having one member selected from the group consisting of one benzene ring structure and one pyridine ring structure; and
      (e) an ingredient comprising:
         (vi) 15 to 50 molar % of at least one member selected from aromatic diamines having one member selected from the group consisting of one benzene ring structure and one pyridine ring structure, and
         (vii) 50 to 85 molar % of at least one member selected from aromatic diamines having 2 to 3 benzene ring structures,
   exposing the opposite face of the aromatic imide polymer asymmetric membrane to an atmosphere under a reduced pressure, to cause at least one type of the organic compound in the mixture to selectively permeate through the asymmetric membrane and the permeated organic compound to be vaporized; and
   collecting the permeated and vaporized organic compound.

2. The method as claimed in claim 1, wherein the principal acid member (a) is selected from the group consisting of 2,3,3',4'-biphenyltetracarboxylic acid, 3,3',4,4'-biphenyltetracarboxylic acid, 3,3',4,4'-diphenylether tetracarboxylic acid, and dianhydrides, lower alkyl esters and salts of the above-mentioned acids.

3. The method as claimed in claim 1, wherein the additional acid member (b) is selected from the group consisting of pyromellitic acid, 2,2-bis(3,4-dicarboxyphenyl)propane, bis(3,4-dicarboxyphenyl)methane, 3,3',4,4'-benzophenonetetracarboxylic acid, and dianhydrides, lower alkyl esters and salts of the above-mentioned acids.

4. The method as claimed in claim 1, wherein the aromatic diamines (i), (iv) and (vii) having 2 to 3 benzene ring structures are selected from the group consisting of bis(aminophenoxy) benzene compounds, bis(aminophenyl)benzene compounds, diaminodiphenylether compounds, diaminodiphenyl thioether compounds, diaminodiphenyl sulfone compounds, diaminodiphenylalkane compounds, diaminobiphenyl compounds, diaminodibenzothiophene compounds, and diaminothioxanthene compounds.

5. The method as claimed in claim 1, wherein the aromatic diamines (ii) other than the aromatic diamine (i) are selected from the group consisting of m-phenylene diamine, p-phenylene diamine, 3,5-diaminobenzoic acid, and 2,6-diamino benzoic acid.

6. The method as claimed in claim 1, wherein the aromatic tetracarboxylic acid component (A) comprises 80 to 100 molar % of the principal acid member (a) and 0 to 20 molar % of the additional acid member (b), and the aromatic diamine component (B) comprises 90 to 100 molar % of the aromatic diamine (i) having 2 to 3 benzene ring structures and 0 to 10 molar % of the other aromatic diamine (ii).

7. The method as claimed in claim 1, wherein the ingredient (c) contains at least 20 molar % of at least one member selected from the group consisting of diaminodibenzothiophene, diaminothioxanthene and diaminodiphenylalkane compounds.

8. The method as claimed in claim 1, where 9,10-di(aminophenyl)anthracene compounds are selected from the group consisting of 9,10-bis(4-aminophenyl)anthracene, 9,10-bis(3-aminophenyl)anthracene and 9-(4-aminophenyl)-10-(3-aminophenyl)anthracene.

9. The method as claimed in claim 1, wherein di(aminophenoxy)diphenylsulfone compounds are selected from the group consisting of 4,4'-bis(4-aminophenoxy)diphenylsulfone, 4,4'-bis(3-aminophenoxy)diphenylsulfone and 3,4'-di(4-aminophenoxy)diphenylsulfone.

10. The method as claimed in claim 1, wherein di(aminophenoxy)diphenyl compounds are selected from the group consisting of 4,4'-di(4-aminophenoxy)biphenyl, 4,4'-di(3-aminophenoxy)biphenyl, 3,4'-di(4-aminophenoxy)biphenyl, and 3,4'-di(3-aminophenoxy)biphenyl.

11. The method as claimed in claim 1, wherein di(aminophenoxy)diphenylalkane compounds are selected from the group consisting of 4,4'-di(4-aminophenoxy)diphenylmethane, 4,4'-di(3-aminophenoxy)diphenylmethane, 2,2-bis[4-(4-aminophenoxy)phenyl] propane, 2,2-bis[4-(3-aminophenoxy)phenyl] propane, 2,2-bis[4-(4-aminophenoxy)phenyl] perfluoropropane, and 2,2-bis[4-(3-aminophenoxy)phenyl] perfluooropropane.

12. The method as claimed in claim 1, wherein the aromatic diamines (v) and (vi) having one benzene or pyridine ring structure are selected from the group consisting of phenylene diamine compounds, diaminobenzoic acid compounds, diaminopyridine compounds, alkylated phenylenediamine compounds and alkoxylated phenylenediamine compounds.

13. The method as claimed in claim 1, wherein the aromatic imide polymer asymmetric membrane is in the form of a hollow filament.

14. The method as claimed in claim 1, wherein the aromatic imide polymer asymmetric membrane is in the form of a film.

15. The method as claimed in claim 1, wherein the aromatic imide polymer asymmetric membrane is prepared by dissolving the solvent soluble polymerization product of the aromatic tetracarboxylic acid component (A) with the aromatic diamine component (B) in a solvent comprising at least one phenolic compound to provide a dope solution; shaping the dope solution into a hollow filament-formed stream or a film-formed layer; bringing the shaped dope solution into contact with a coagulating bath to provide a solidified membrane; washing the solidified membrane with an organic solvent not capable of dissolving the solidified membrane; drying the washed membrane; and aging the dried membrane at a temperature of 150° C. to 420° C.

16. The method as claimed in claim 1, wherein the aromatic tetracarboxylic acid component (A) comprises:
90 to 100 molar % of at least one principal member selected from the group consisting of biphenyl tetracarboxylic acids, diphenylether tetracarboxylic acids, and dianhydrides, esters and salts of the above-mentioned acids, and
0 to 10 molar % of at least one additional member selected from the group consisting of aromatic tetracarboxylic acids, and dianhydrides, esters and salts of the above-mentioned acids, which are different from the above-mentioned member; and
the aromatic diamine component (B) comprises:
90 to 100 molar % of at least one principal member selected from aromatic diamines having 2 to 3 benzene ring structures, and
0 to 10 molar % of at least one additional member selected from aromatic diamines other than the above-mentioned aromatic diamines for the principal member.

17. The method as claimed in claim 1, wherein the aromatic tetracarboxylic acid component (A) comprises:
70 to 100 molar % of at least one principal member selected from the group consisting of biphenyltetracarboxylic acids, and dianhydrides, esters and salts of the above-mentioned acids, and
0 to 30 molar % of at least one additional member selected from the group consisting of aromatic tetracarboxylic acids, and dianhydrides, esters and salts of the above-mentioned acids, which are different from the above-mentioned compounds for the principal member; and
the aromatic diamine component (B) comprises:
15 to 100 molar % of at least one member selected from the group consisting of 9,10-di(aminophenyl)anthracene compounds, di(aminophenoxy)diphenylsulfone compounds, di(aminophenoxy) biphenyl compounds, and di(aminophenoxy)diphenylalkane compounds, and
0 to 85 molar % of at least one member selected from aromatic diamines having 2 to 3 benzene ring structures, and
0 to 15 molar % of at least one member selected from aromatic diamines having one member selected from the group consisting of one benzene ring structure and one pyridine ring structure.

18. The method as claimed in claim 1, wherein the aromatic tetracarboxylic acid component (A) comprises:
70 to 100 molar % of at least one principal member selected from the group consisting of biphenyl tetracarboxylic acids, and dianhydrides, esters and salts of the above-mentioned acids, and
0 to 30 molar % of at least one additional member selected from the group consisting of aromatic tetracarboxylic acids and dianhydrides, esters and salts of the above-mentioned acids, which are different from the above-mentioned compounds for the principal member; and
the aromatic diamine component (B) comprises:
15 to 50 molar % of at least one member selected from the aromatic diamines having one member selected from the group consisting of one benzene ring structure and one pyridine ring structure, and
50 to 85 molar % of at least one member selected from aromatic diamines having 2 to 3 benzene ring structures.

* * * * *

UNITED STATES PATENT AND TRADEMARK OFFICE
CERTIFICATE OF CORRECTION

PATENT NO. : 4,959,151

DATED : September 25, 1990

INVENTOR(S) : Masayuki Nakatani, et al

It is certified that error appears in the above-identified patent and that said Letters Patent is hereby corrected as shown below:

Title page, under Item 30, third priority document: Change "63-25053" to --63-252053--

Signed and Sealed this

Seventeenth Day of March, 1992

Attest:

HARRY F. MANBECK, JR.

*Attesting Officer*    *Commissioner of Patents and Trademarks*